(12) United States Patent
Jiang et al.

(10) Patent No.: US 11,669,667 B2
(45) Date of Patent: Jun. 6, 2023

(54) AUTOMATIC TEST PATTERN GENERATION (ATPG) FOR PARAMETRIC FAULTS

(71) Applicant: Synopsys, Inc., Mountain View, CA (US)

(72) Inventors: Peilin Jiang, Santa Clara, CA (US); Mayukh Bhattacharya, Palo Alto, CA (US); Chih Ping Antony Fan, Saratoga, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 17/180,013

(22) Filed: Feb. 19, 2021

(65) Prior Publication Data

US 2021/0264087 A1 Aug. 26, 2021

Related U.S. Application Data

(60) Provisional application No. 62/979,725, filed on Feb. 21, 2020.

(51) Int. Cl.
| | | |
|---|---|---|
| *G06F 30/367* | (2020.01) | |
| *G06N 7/00* | (2023.01) | |
| *G06F 111/04* | (2020.01) | |
| *G06F 111/10* | (2020.01) | |
| *G06F 119/12* | (2020.01) | |

(52) U.S. Cl.
CPC ........... *G06F 30/367* (2020.01); *G06N 7/005* (2013.01); *G06F 2111/04* (2020.01); *G06F 2111/10* (2020.01); *G06F 2119/12* (2020.01)

(58) Field of Classification Search
CPC .. G06F 17/18; G06F 2111/04; G06F 2111/10; G06F 30/20; G06F 2111/08; G06F 2119/12; G06F 2209/501; G06F 11/00; G06F 11/3447; G06F 11/3452;
(Continued)

(56) References Cited

U.S. PATENT DOCUMENTS 5,809,459 A * 9/1998 Bergstrom ............ G10L 19/125
704/223
6,922,819 B2 * 7/2005 Visweswariah ......... G06F 30/36
716/135

(Continued)

OTHER PUBLICATIONS

Cui et al.; "Chance-Constrained and Yield-Aware Optimization of Photonic ICs With Non-Gaussian Correlated Process Variations"; IEEE Transactions on Computer-Aided Design of Integrated Circuits and Systems; vol. 39, Issue: 12 | Journal Article; Publisher : IEEE (Year: 2020).*

(Continued)

*Primary Examiner* — Helen Rossoshek
(74) *Attorney, Agent, or Firm* — Park, Vaughan, Fleming & Dowler LLP; Laxman Sahasrabuddhe

(57) ABSTRACT

Systems and methods for automatic test pattern generation (ATPG) for parametric faults are described. A model may be constructed to predict a measurement margin for an integrated circuit (IC) design based on a random sample of random variables. A set of failure events may be determined for the IC design using the model, where each failure event may correspond to a set of values of the random variables that is expected to cause a metric for the IC design to violate a threshold.

18 Claims, 5 Drawing Sheets

(58) Field of Classification Search
CPC .............. G06F 2119/18; G06F 30/398; G06F 30/3308; G06F 30/367
See application file for complete search history.

(56) References Cited

U.S. PATENT DOCUMENTS

| | | | | |
|---|---|---|---|---|
| 7,457,729 | B2* | 11/2008 | Khoche | G01R 31/31917 |
| | | | | 702/109 |
| 8,122,392 | B2* | 2/2012 | White | G06F 30/39 |
| | | | | 716/54 |
| 8,713,025 | B2* | 4/2014 | Eder | G06F 16/951 |
| | | | | 707/711 |
| 9,483,602 | B2* | 11/2016 | McConaghy | G06F 30/367 |
| 9,858,529 | B2* | 1/2018 | Adams | G06N 20/10 |
| 10,074,054 | B2* | 9/2018 | Adams | G06F 17/11 |
| 10,452,793 | B2* | 10/2019 | Joshi | G06N 5/045 |
| 10,963,802 | B1* | 3/2021 | Gardner | G06N 5/003 |
| 2006/0045325 | A1 | 3/2006 | Zavadsky et al. | |
| 2013/0062771 | A1 | 3/2013 | Kodama et al. | |
| 2014/0131879 | A1 | 5/2014 | Kodama et al. | |
| 2018/0219636 | A1* | 8/2018 | Gale | H04B 17/0085 |
| 2018/0349158 | A1* | 12/2018 | Swersky | G06N 3/0472 |
| 2020/0143252 | A1* | 5/2020 | Dasgupta | G06K 9/00536 |
| 2021/0323578 | A1* | 10/2021 | Wang | G06F 17/18 |
| 2022/0108262 | A1* | 4/2022 | Celia | G06Q 10/063118 |

OTHER PUBLICATIONS

Touloupas et al.; "LoCoMOBO: A Local Constrained Multi-Objective Bayesian Optimization for Analog Circuit Sizing"; IEEE Transactions on Computer-Aided Design of Integrated Circuits and Systems; Early Access Article | Publisher: IEEE (Year: 2021).*

Weller Dennis D. et al, "Optimized Mixture Importance Sampling for High-Sigma Failure Rate Estimation", IEEE Transactions on Computer Aided Design of Integrated Circuits and Systems, vol. 39, No. 10, Dec. 20, 2019, pp. 2772-2783.

Alp Arslan Bayrakci et al., "Fast Monte Carlo Estimation of Timing Yield With Importance Sampling and Transistor-Level Circuit Simulation", IEEE Transactions on Computer Aided Design of Integrated Circuits and Systems, vol. 29, No. 9, Sep. 1, 2010, pp. 1328-1341.

Zhang Shuhan et al., "Bayesian Methods for the Yield Optimization of Analog and SRAM Circuits", proc. of 25th IEEE Asia and South Pacific Design Automation Conference, Jan. 13, 2020, pp. 440-445.

P.N. Variyam, S et al., "Prediction of analog performance parameters using fast transient testing", IEEE Transactions on Computer-Aided Design of Integrated Circuits and Systems, vol. 21, No. 3, Mar. 2002.

H. Tran-The et al., "Trading Convergence Rate with Computational Budget in High Dimensional Bayesian Optimization", arXiv:1911.11950, 2019, downloaded at https://www.semanticscholar.org/paper/Trading-Convergence-Rate-with-Computational-Budget-Tran-The-Gupta/57f34e6fda47db2955be9747b960811d9e951f29 on Feb. 18, 2021.

* cited by examiner

AUTOMATIC TEST PATTERN GENERATION (ATPG) FOR PARAMETRIC FAULTS

RELATED APPLICATION

This application claims the benefit of U.S. Provisional Application Ser. No. 62/979,725, filed on 21 Feb. 2020, the contents of which are herein incorporated by reference in their entirety for all purposes.

TECHNICAL FIELD

The present disclosure relates to automatic test pattern generation (ATPG). More specifically, the present disclosure relates to ATPG for parametric faults.

BACKGROUND

Testing integrated circuit (IC) designs is important. It would be risky to use large and complex IC designs in critical applications without rigorous testing. Faults in analog circuits may be classified as hard faults (also known as catastrophic faults) and soft faults (also known as parametric faults). A hard fault changes a circuit's topology, e.g., an open in a connection or a short between two connections. A soft or parametric fault is a change in a principal parameter of a circuit element, but this type of fault does not change a circuit's topology. Parametric faults may be caused by variations in component parameters (which may be caused by degradation of components and/or process variations) and may degrade one or more important metrics associated with the analog circuit. Thus, it is important to test circuits for parametric faults.

Numerical simulation is a commonly used technique for analyzing parametric faults. However, IC design may be complex and may include nonlinear devices, which can make numerical simulation very time consuming. Moreover, because parametric variations are continuous, the number of the parameter combinations is infinite. Thus, exhaustive analysis of parametric faults is impossible.

SUMMARY

Embodiments described herein feature techniques and systems for ATPG for parametric faults. A model may be constructed to predict a measurement margin for an IC design based on a random sample of random variables, which may include, but are not limited to, a process variable, a voltage variable, and a temperature variable. In some embodiments, the model may be a Gaussian process (GP) model. Next, a set of failure events may be determined for the IC design using the model, where each failure event corresponds to a set of values of the random variables that is expected to cause a metric for the IC design to violate a threshold.

In some embodiments, determining the set of failure events for the IC design may include constructing an acquisition function, and using an optimization technique (e.g., Bayesian optimization (BO)) to adaptively determine samples of the random variables by using the acquisition function. Using the acquisition function may enable exploration of multiple failure regions of a search space defined by the random variables.

In some embodiments, a probability density function may be determined based on the set of failure events. Next, a weight function may be determined based on the probability density function, where the weight function may be associated with an importance sampling process. The importance sampling process (with the determined weight function) may then be used to calculate a failure rate of the IC design. Next, BO may be used to determine a set of excitation waveforms based on maximizing the failure rate of the IC design. Specifically, each excitation waveform in the set of excitation waveforms may be represented as a piece-wise linear (PWL) function, and the set of excitation waveforms may be used for testing parametric faults in the IC design.

BRIEF DESCRIPTION OF THE FIGURES

The disclosure may be understood based on the detailed description given below and the accompanying figures. The figures are for illustrative purposes, and do not limit the scope of the disclosure. Furthermore, the figures are not necessarily drawn to scale.

DETAILED DESCRIPTION

Figure 1:
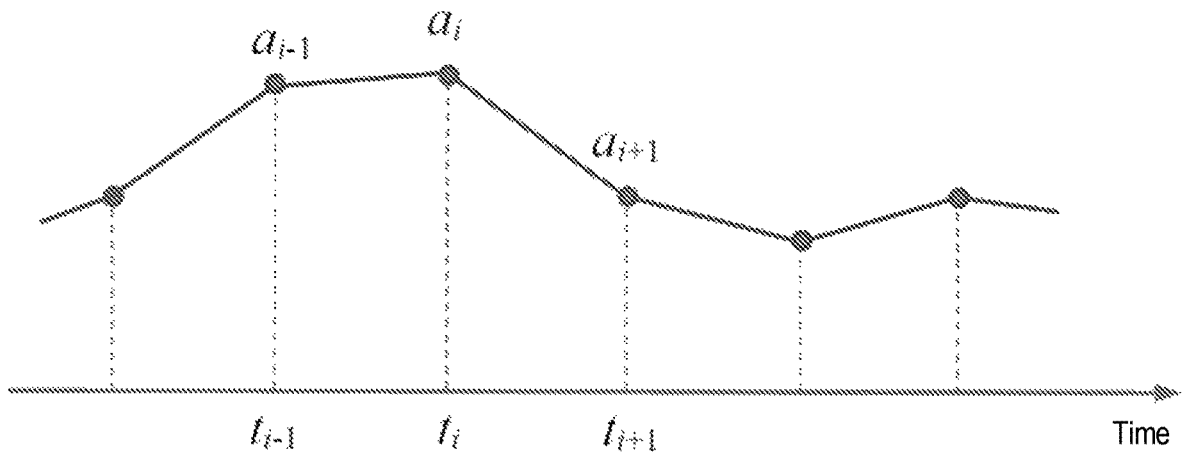
FIG. 1 illustrates a parameterization of a stimulus waveform using a PWL function in accordance with some embodiments described herein.

Aspects of the present disclosure relate to ATPG for parametric faults. For a digital circuit, ATPG may generate a set of digital test patterns, i.e., an assignment of "0" and "1" values to a set of inputs. For an analog circuit, ATPG for parametric faults may generate excitation waveforms that can be applied to a set of inputs of the analog circuit to achieve a desired test coverage.

Some ATPG techniques for parametric faults are computationally inefficient and are not robust. Specifically, some ATPG techniques may make too many calls to a numerical simulator, which may be computationally costly. Moreover, some ATPG techniques are incapable of handling multiple failure regions.

Embodiments described herein may represent the excitation waveform (i.e., the test pattern) as a PWL function in which the amplitudes at selected time points are configurable (i.e., these amplitudes may be changed). The failure rate, which may be defined as the percentage of occurrences when one or more measurements exceed normal ranges (i.e., violate one or more thresholds), may be increased by changing these amplitudes, which may guarantee the robustness of the ATPG.

Measurements (e.g., delay values) may be obtained from responses (e.g., the response generated by the analog circuit when an excitation waveform is applied as an input), which may be calculated numerically by using a simulator, such as Simulation Program with Integrated Circuit Emphasis (SPICE). To improve computational efficiency, some embodiments construct a surrogate model (or meta-model)

to map process, voltage, and temperature (PVT) variables to the measurement margin, which makes it possible to reduce the number of calls that are made to the simulator.

Advantages of embodiments described herein include, but are not limited to, (1) significantly increasing the computational efficiency of ATPG for parametric faults (i.e., by significantly reducing the amount of computational resources used for generating excitation waveforms for a desired test coverage), (2) significantly increasing the robustness of ATPG for parametric faults, and (3) handling multiple failure regions in ATPG for parametric faults.

Some embodiments may use a GP to build the surrogate model because a GP may provide high prediction accuracy with a small training set. A BO scheme which adaptively determines the next samples' locations by optimizing an acquisition function may be used to determine the border of failure regions using a small number of samples. The acquisition function may be modified to make it possible to explore multiple failure regions.

Once the surrogate model has been created and fitted, the failed cases may be determined using the surrogate model instead of using a simulator (which can be computationally expensive). A probability density function may be constructed from the failed cases that were determined using the surrogate model.

Next, an importance sampling scheme may be used to calculate the failure rate. Specifically, a weight function may be determined from the probability density function, and the simulator may be used for determining the failure rate. As explained in reference to Equation (9) below, the original probability density function is p(X), the new probability density function is q(X), and the weight function is p(X)/q(X) Importance sampling may guarantee good integration accuracy using a small number of samples. The constructed density function may enable embodiments described herein to handle multiple failure regions.

Another layer of BO may be used to determine the amplitudes of the time points in the PWL function by using the failure rate (e.g., by maximizing the failure rate) with a reduced number of calls to processes described above. These techniques may be used together to provide robustness and computational efficiency.

Let S denote the stimulus, P the PVT variables, M the measurement of a result (e.g., delay) of interest, and $M_t$ the threshold of measurement M to detect a failure, i.e., a failure is determined when the measurement is compared with $M_t$. The condition for detecting a failure depends on the parameter. Specifically, depending on the parameter, a failure may be defined to occur if (1) the measurement is greater than a threshold, (2) the measurement is less than a threshold, (3) the measurement is outside a permissible range of values, or (4) the measurement is within a non-permissible range of values. The failure rate can be written as FR(S, P, $M_t$). The ATPG for parametric faults may be formulated as an optimization problem where the objective is to maximize failure rate by optimizing the excitation, i.e., $$\text{Test pattern} = \text{argmax}_S FR(S, P, M_t) \quad (1)$$

A test pattern that is not likely to cause a defective IC design to fail is not useful. Thus, Equation (1) states that the test patterns that are desired to be generated are those that maximize the failure rate, i.e., these test patterns are likely to cause a defective IC design to fail. Suppose X is a particular point in the parameter space spanned by D-dimensional random PVT variables. Different points in the parameter space may occur with different probabilities. For a given point in the parameter space, the IC design may or may not fail. Formally, the probability density function for X may be denoted as p(X), and the failure rate, $P_f$, may be defined as:

$$P_f = \int I(X)p(X)dX, \quad (2)$$

$$P_f = \int I(X)p(X)dX, \quad (2)$$

where $I(X) = \begin{cases} 1, & \text{if failure occurs,} \\ 0, & \text{otherwise} \end{cases}$.

The integral in Equation (2) is typically intractable. Thus, Monte Carlo (MC) based techniques may be used to estimate the failure rate, $P_f$, as follows:

$$\hat{P}_f = \frac{1}{N}\sum_{i=1}^{N} I(X_i). \quad (3)$$

In Equation (3), $\hat{P}_f$ is the estimate for the failure rate that is calculated by averaging over the N samples that are generated by the MC technique. For large N values, the estimated failure rate approaches the actual failure rate, i.e., $$\hat{P}_f \xrightarrow{N \to \infty} P_f.$$

In MC based techniques, samples are repeatedly collected, and circuit performance is repeatedly evaluated using transistor-level simulations. Moreover, a large number (i.e., a large N value) of samples may be used to ensure that the estimate is highly accurate. Therefore, MC based techniques may be computationally expensive.

Some embodiments described herein may efficiently and accurately calculate the failure rate by using a surrogate model to map the PVT variables to circuit performance results and an adaptive importance sampling scheme to accurately evaluate the integral in Equation (2).

Specifically, some embodiments may use a GP to build the surrogate model to map PVT variables to circuit performance Given a training set $\{(X_1, -g(X_1)), (X_2, -g(X_2)), \ldots, (X_n, -g(X_n))\}$, where $g(X) = (M(X) - M_t)^2$ is the measurement margin, the statistical moments of the GP, which may be expressed in terms of a function using hyperparameters, may be learnt from the training set. The measurement margin may correspond to the level or extent of the failure. For example, in the case of delay, the level or extent of the failure may be measured by the negative slack, e.g., a slack of −5 is a worse failure than a slack of −1. The expected value and standard deviation of the measurement for a given parameter configuration, X, i.e., μ(X) and σ(X) may then be obtained.

The GP model may be used to predict or estimate the measurement margin (e.g., the extent by which a failure occurs) for a given X. For example, the GP model may be used to predict or estimate the negative slack. The notation g(X) is used to represent the actual measurement margin as calculated by a numerical simulator (e.g., SPICE), and the notation g̃(X) is used to represent the measurement margin predicted or estimated by the GP model. The border of the measurement margin may be determined by solving the following optimization problem:

$$X_{border} = \text{argmax}_X(\tilde{g}(X)), \quad (4)$$

where $\tilde{g}(X)$ is the GP prediction of the measurement margin under input X. In other words, $X_{border}$ is the value of X that maximizes the predicted measurement margin.

To provide high accuracy with a small number of samples, an adaptive scheme may be used to select the next sample position by maximizing an acquisition function, e.g., $$X_{next} = \text{argmax}_X AF(\tilde{g}(X)). \tag{5}$$

In Equation (5), $AF(\tilde{g}(X))$ is the acquisition function for $\tilde{g}(X)$. An acquisition function may be a function that allows an iterative optimization process to move quickly toward an optimum value. For example, $X_{border}$ in Equation (4) may be determined by using an iterative process that uses an acquisition function to iteratively reach $X_{border}$. The value $X_{next}$ in Equation (5) is the "next" X value that is determined in each iteration by using the acquisition function. Because X may have a high dimension, a modified BO, which uses an acquisition function that uses maximization on a discrete set of low dimensional subspaces embedded in the original dimensional search space, may be used (which is described in more detail below).

When there are multiple failure regions, the new samples may be trapped in one of the failure regions if the acquisition function shown in Equation (5) is used. In some embodiments, the acquisition function may be modified as follows:

$$X_{next} = \text{argmax}_X[AF(\tilde{g}(X)) * \Pi_i \|X - X_i\|]. \tag{6.1}$$

In some embodiments, the acquisition function may be modified as follows ("D" is a constant in Equation (6.2) shown below):

$$X_{next} = \text{argmax}_X\left[AF(\tilde{g}(X)) * \prod_i \frac{\|X - X_i\|^2}{\|X - X_i\|^2 + D}\right]. \tag{6.2}$$

The modifications to the acquisition function shown in Equations (6.1) and (6.2) can cause the next sample to be as far away as possible from the existing samples, which may enable the embodiments to avoid being trapped in a single failure region and allow the embodiments to explore other failure regions.

A large number of samples may be generated using the surrogate model, and the failed cases/events may be determined using a threshold T, i.e., $$C(X) = \begin{cases} 1, & \tilde{g}(X) \geq T \\ 0, & \tilde{g}(X) < T \end{cases} \tag{7}$$

Next, a probability density function can then be constructed as:

$$q(X) = \frac{1}{\sum_i C(X_i)} \sum_i C(X_i) N(X \mid X_i, \sigma) \tag{8}$$

Then, the failure rate can be found using importance sampling as follows:

$$P_f = \int I(X) \frac{p(X)}{q(X)} q(X) dX \tag{9}$$

In Equation (9), p(X) is the probability distribution of X as explained in reference to Equation (2), q(X) is calculated using Equation (8), and the function p(X)/q(X) is the weighting function that is used for importance sampling. Importance sampling refers to a technique that generates samples based on a first distribution (p(X) in the above example) by using a second distribution (q(X) in the above example) in conjunction with a weighting function (p(X)/q(X) in the above example) to account for the difference between the two distributions. Specifically, the integral in Equation (9) may be evaluated using MC as follows:

$$\hat{P}_f = \frac{1}{n}\sum_{i=1}^{n} I(X_i) \frac{p(X_i)}{q(X_i)} \xrightarrow{n \to \infty} P_f, \tag{10}$$

where the number of samples (n) in Equation (10) that provides high accuracy is significantly smaller than the samples (N) in Equation (3) that would provide an equivalently high accuracy. When evaluating $I(X_i)$, the simulator may be used to generate $M(X_i)$ because the number of samples is significantly less than in Equation (3). Using the simulator provides a higher level of accuracy than using the surrogate model. Additionally, using an adaptive sampling scheme ensures that multiple failure regions (if they exist) are explored.

FIG. 1 illustrates a parameterization of a stimulus waveform using a PWL function in accordance with some embodiments described herein.

The X-axis may correspond to time, and the Y-axis may correspond to a quantity of interest, e.g., voltage or current. The PWL function may be specified by amplitudes $a_i$ at time points $t_i$, where i=1, 2, ..., m. The amplitude values, i.e., $a_i$ may be the parameters that are to be determined during ATPG for parametric faults. Other parametrization techniques may also be used, e.g., superposition of weighted basis functions, where the coefficients of the basis functions are the parameters that are to be determined during ATPG for parametric faults.

To minimize the number of calls that are made to the failure rate calculation function, BO may be utilized. Specifically, a GP model may first be developed to map $A=\{a_1, a_2, \ldots, a_m\}$ to FR, given the data set $\{(A_1, FR_1), (A_2, FR_2), \ldots, (A_n, FR_n)\}$. Then, the next point $A_{next}$ may be determined by maximizing an acquisition function as follows:

$$A_{next} = \text{argmax}_A AF(\widetilde{FR}(A)), \tag{11}$$

where $\widetilde{FR}(A)$ is the GP prediction of the failure rate under input A.

If a PWL function is used for parameterizing the stimulus, then the number of time points may be large. In such situations, BO may be performed on a low-dimensional subspace of the original space, and the dimension of the subspace may be increased with the BO steps. The acquisition function may also be modified to adapt to the low dimension.

For example, suppose the parameters are normalized and the search space is $\mathcal{X} = [-1,1]^D$, and the function y=f(x) maps parameters $x \in \mathcal{X}$ to y. The following pseudocode may be used to build the GP.

Input: $\mathcal{X}$, $d \in [1, D-1]$, $Z_0 = \emptyset$, and parameters $N_0$ and $\alpha$.
Sample initial points to construct $D_0 = [-1,1]^d$ and build a GP using $D_0$.
For t=1, 2, ..., $N_{step}$ do
    Sample uniformly at random $N_t$ values of $z_t^i \in [-1,1]^{D-d}$, where $i \in [1, N_t]$, $N_t = N_0 t^\alpha$.
    Update $Z_t = Z_{t-1} \cup \{z_t^1, z_t^2, \ldots, z_t^{N_t}\}$.

Obtain the next sample as $x_t$=argmax $AF_t(x)$, where $\mathcal{X}_t = D_0 \cup Z_t$, $$AF_t(x) = \mu_{t-1}(x) + \sqrt{\beta_t}\,\sigma_{t-1}(x), \text{ and}$$

$$\beta_t = 2\log\left(\frac{\pi^2 t^2}{\delta}\right) + 2d\log\left[2bd\sqrt{\log\left(\frac{6Da}{\delta}t^2\right)}\right].$$

Calculate $y_t=f(x_t)$.

Augment the data as $D_t=D_{t-1}\cup(x_t,y_t)$, and build a GP using $D_t$.

End for loop.

Figure 2:
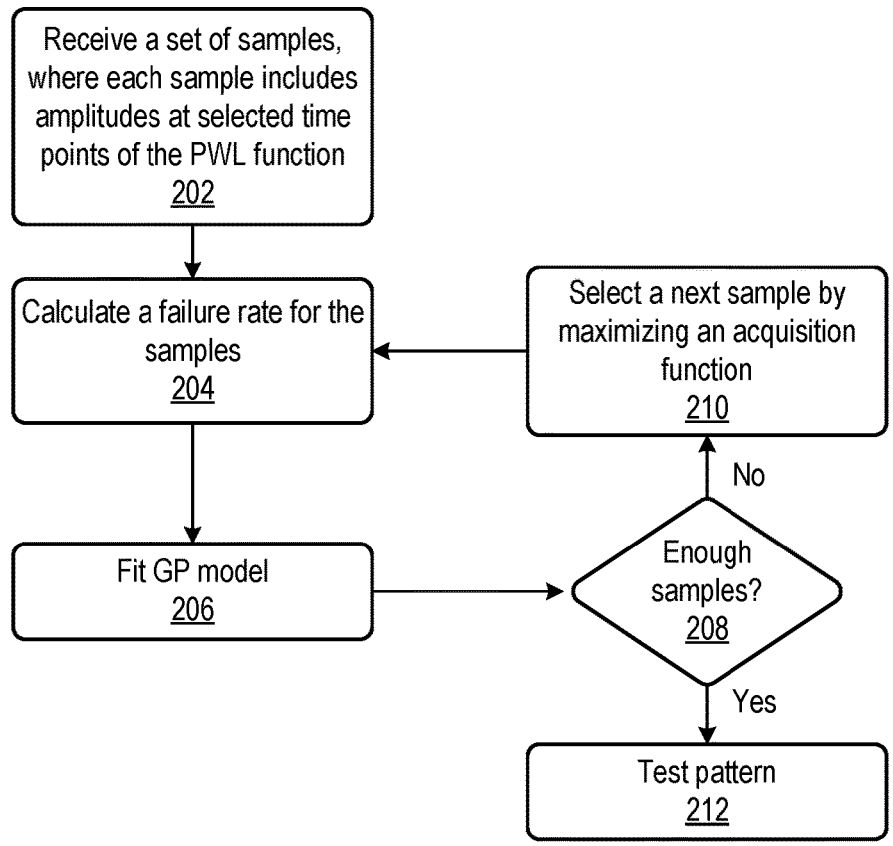
FIG. 2 illustrates a process for generating test patterns in accordance with some embodiments described herein.

FIG. 2 illustrates a process for generating test patterns in accordance with some embodiments described herein. A set of samples may be received, where each sample includes amplitudes at selected time points of the PWL function (at 202). For example, each sample may include a set of amplitudes $a_i$ at time points $t_i$, where i=1, 2, . . . , m. Next, a failure rate for the samples may be calculated (at 204). A GP model may be fit based on the failure rate calculations (at 206). Next, the process may check if enough samples have been collected (at 208), e.g., the process may determine if the number of collected samples is greater than a threshold number of samples. If enough samples have been collected ("Yes" branch), then the collected samples may be provided as the test pattern (at 212). On the other hand, if not enough samples have been collected ("No" branch), then the process may select the next sample by maximizing an acquisition function (at 210) and loop back to calculating the failure rate (at 204).

Figure 3:
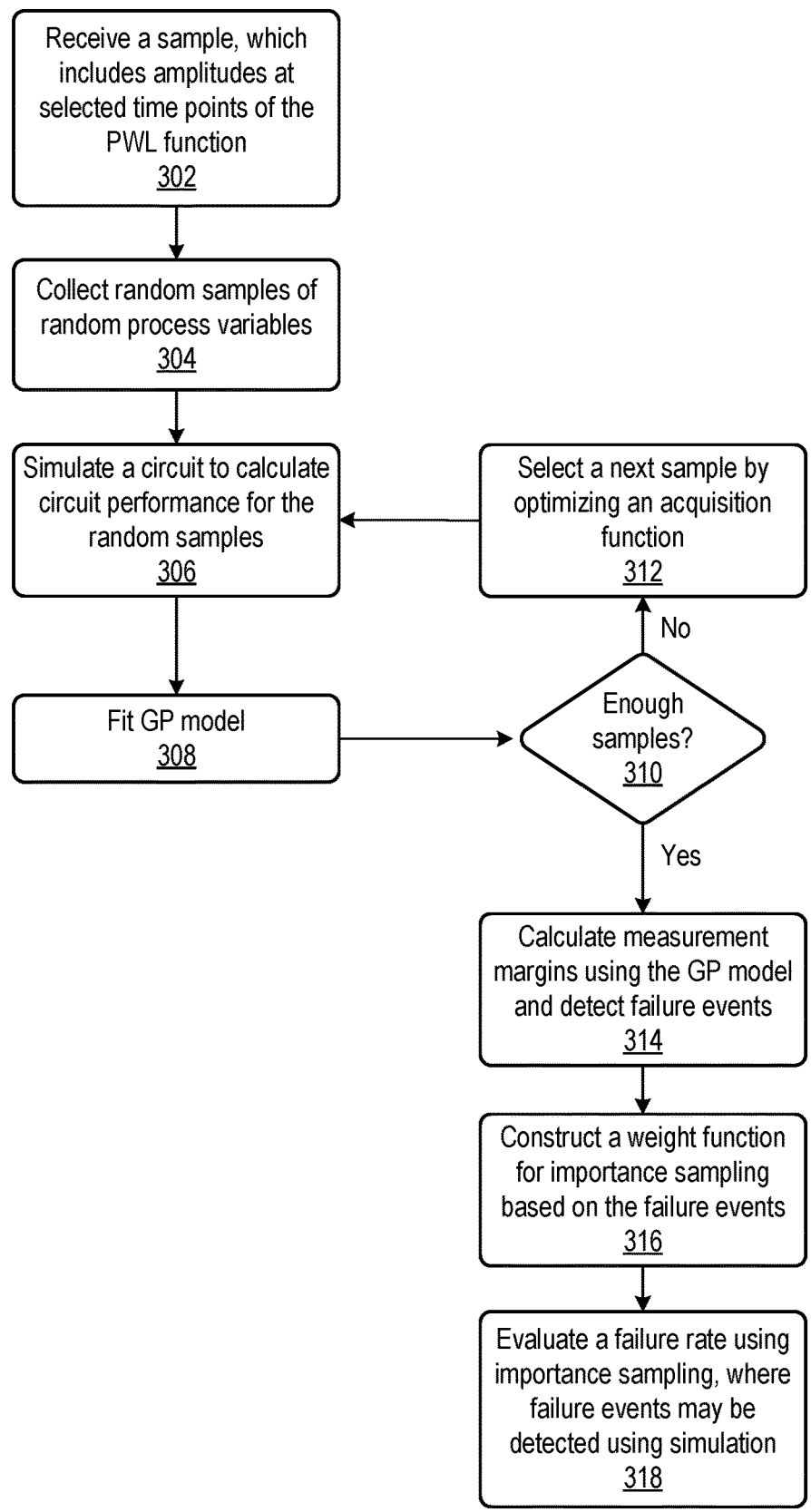
FIG. 3 illustrates a process for calculating a failure rate in accordance with some embodiments described herein.

FIG. 3 illustrates a process for calculating a failure rate in accordance with some embodiments described herein. The process illustrated in FIG. 3 may be used to implement process block 204 which calculates failure rates for samples.

A sample may be received, which includes amplitudes at selected time points of the PWL function (at 302). For example, each sample may include a set of amplitudes $a_i$ at time points $t_i$, where i=1, 2, . . . , m. Next, random samples of random process variables are collected (at 304). Specifically, PVT variations may be modeled as random variables, and the probability distributions of these random variables may be used to sample random PVT variations. A circuit may be simulated to calculate circuit performance for the random samples (at 306). Specifically, SPICE may be used to simulate the behavior of the circuit under conditions that are defined using the random samples (e.g., random process, voltage, and temperature values). In general, any behavior of the circuit may be measured using simulation. For example, in some embodiments, the delay between an input transition and an output transition may be measured using simulation.

Next, the random samples (e.g., random PVT samples) and the circuit performance (e.g., delay) may be used to fit a GP model (308). The GP model used at 308 is separate from the GP model used at 206. The process may check if enough samples have been collected (at 310), e.g., the process may determine if the number of collected samples is greater than a threshold number of samples.

If enough samples have been collected ("Yes" branch), then the collected samples may be used to calculate measurement margins using the GP model and detect failure events (at 314). Next, the process may construct a weight function for importance sampling based on the failure events (at 316). The process may then evaluate a failure rate using importance sampling, where failure events may be determined using simulation (at 318).

On the other hand, if not enough samples have been collected ("No" branch), then the process may select the next sample by optimizing an acquisition function (at 312) and loop back to simulating the circuit based on the next sample (at 306).

Figure 4:
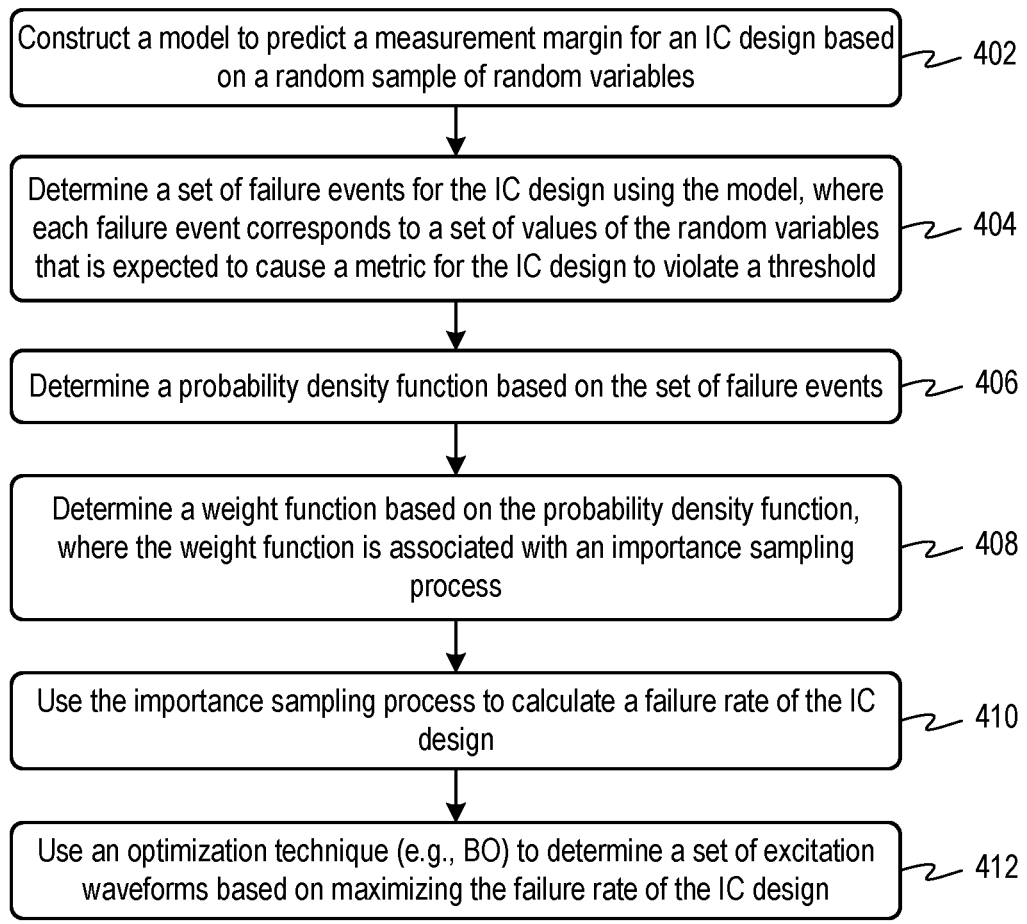
FIG. 4 illustrates a process for generating excitation waveforms in accordance with some embodiments described herein.

FIG. 4 illustrates a process for generating excitation waveforms in accordance with some embodiments described herein.

A model may be constructed to predict a measurement margin for an IC design based on a random sample of random variables (at 402). In some embodiments, the random variables may include a process variable, a voltage variable, and a temperature variable. In some embodiments, the model may be a GP model.

Next, a set of failure events may be determined for the IC design using the model, where each failure event may correspond to a set of values of the random variables that are expected to cause a metric for the IC design to violate a threshold (at 404). For example, a particular PVT corner (a set of values of the random variables) may be expected to cause the total negative slack (the metric) to be negative (i.e., violate the threshold zero). Some embodiments may determine the set of failure events for the IC design by constructing an acquisition function and using an optimization technique (e.g., BO) to adaptively determine samples of the random variables by using the acquisition function. Using the acquisition function may enable exploration of multiple failure regions of a search space defined by the random variables.

A probability density function may be determined based on the set of failure events (at 406). Next, a weight function may be determined based on the probability density function, where the weight function may be associated with an importance sampling process (at 408). The importance sampling process may then be used to calculate a failure rate of the IC design (at 410). Next, an optimization technique (e.g., BO) may be used to determine a set of excitation waveforms based on maximizing the failure rate of the IC design (at 412). Each excitation waveform in the set of excitation waveforms may be represented as a PWL function, and the set of excitation waveforms may be used for testing parametric faults in the IC design.

Figure 5:
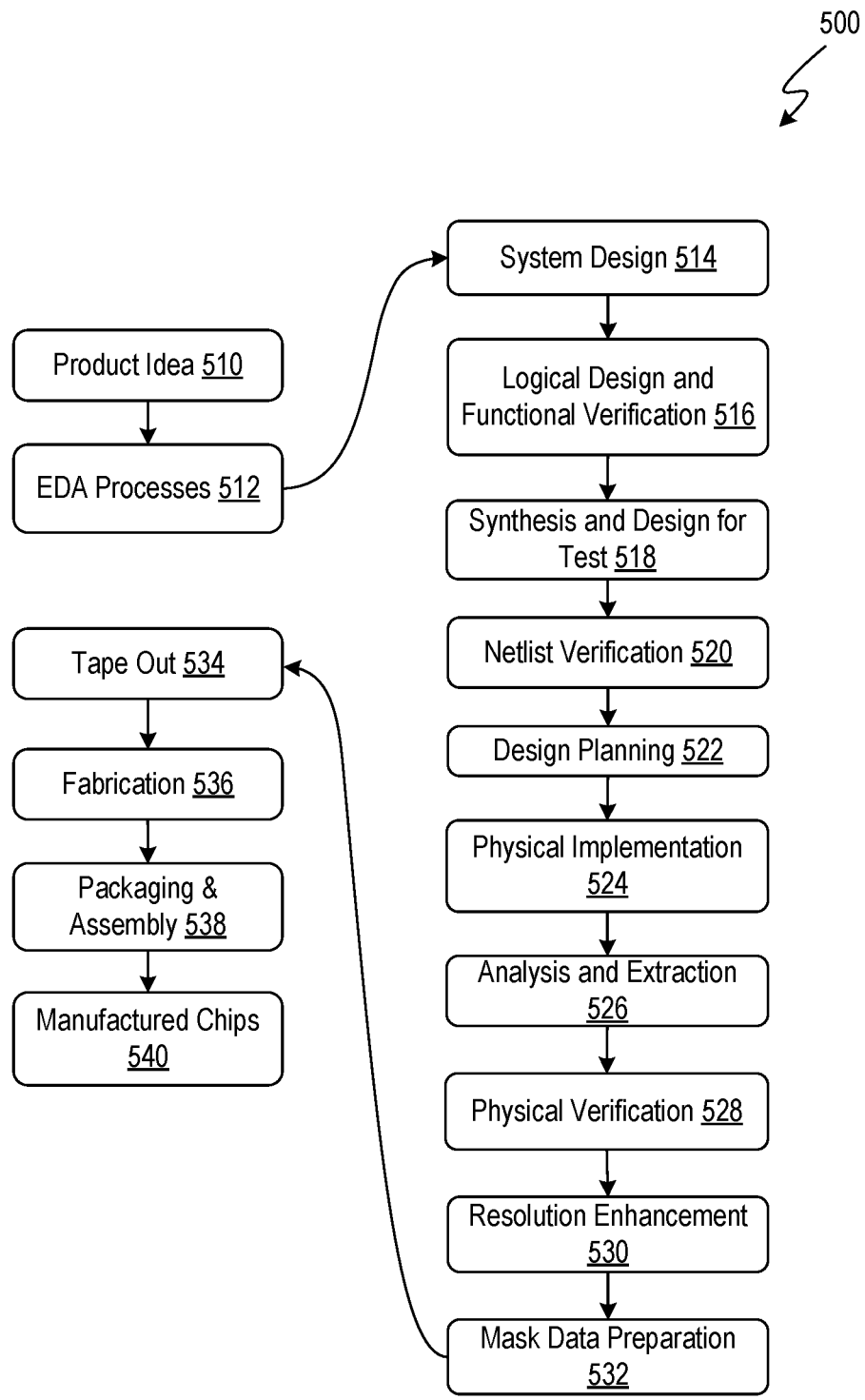
FIG. 5 illustrates an example flow for the design, verification, and fabrication of an integrated circuit in accordance with some embodiments described herein.

FIG. 5 illustrates an example flow 500 for the design, verification, and fabrication of an integrated circuit in accordance with some embodiments described herein. EDA processes 512 (the acronym "EDA" refers to "Electronic Design Automation") can be used to transform and verify design data and instructions that represent the integrated circuit. Each of these processes can be structured and enabled as multiple modules or operations.

Flow 500 can start with the creation of a product idea 510 with information supplied by a designer, information which is transformed and verified by using EDA processes 512. When the design is finalized, the design is taped-out 534, which is when artwork (e.g., geometric patterns) for the integrated circuit is sent to a fabrication facility to manufacture the mask set, which is then used to manufacture the integrated circuit. After tape-out, a semiconductor die is fabricated 536 and packaging and assembly 538 are performed to produce the manufactured IC chip 540.

Specifications for a circuit or electronic structure may range from low-level transistor material layouts to high-level description languages. A high-level of representation may be used to design circuits and systems, using a hardware description language ("HDL") such as VHDL, Verilog, SystemVerilog, SystemC, MyHDL or OpenVera. The HDL description can be transformed to a logic-level register transfer level ("RTL") description, a gate-level description, a layout-level description, or a mask-level description. Each lower representation level that is a more detailed description adds more detail into the design description. The lower levels of representation that are more detailed descriptions can be generated by a computer, derived from a design library, or created by another design automation process. An example of a specification language at a lower level of representation language for specifying more detailed descriptions is SPICE (which stands for "Simulation Program with Integrated Circuit Emphasis"). Descriptions at each level of representation contain details that are sufficient for use by the corresponding tools of that layer (e.g., a formal verification tool).

During system design 514, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 516, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as "emulators" or "prototyping systems" are used to speed up the functional verification.

During synthesis and design for test 518, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 520, the netlist is checked for compliance with timing constraints and for correspondence with the HDL code. During design planning 522, an overall floor plan for the integrated circuit is constructed and analyzed for timing and top-level routing.

During layout or physical implementation 524, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 526, the circuit function is verified at the layout level, which permits refinement of the layout design. During physical verification 528, the layout design is checked to ensure that manufacturing constraints are correct, such as DRC constraints, electrical constraints, lithographic constraints, and that circuitry function matches the HDL design specification. During resolution enhancement 530, the geometry of the layout is transformed to improve how the circuit design is manufactured.

During tape-out, data is created to be used (after lithographic enhancements are applied if appropriate) for production of lithography masks. During mask data preparation 532, the 'tape-out' data is used to produce lithography masks that are used to produce finished integrated circuits.

A storage subsystem of a computer system (such as computer system 600 of FIG. 6) may be used to store the programs and data structures that are used by some or all of the EDA products described herein, and products used for development of cells for the library and for physical and logical design that use the library.

Figure 6:
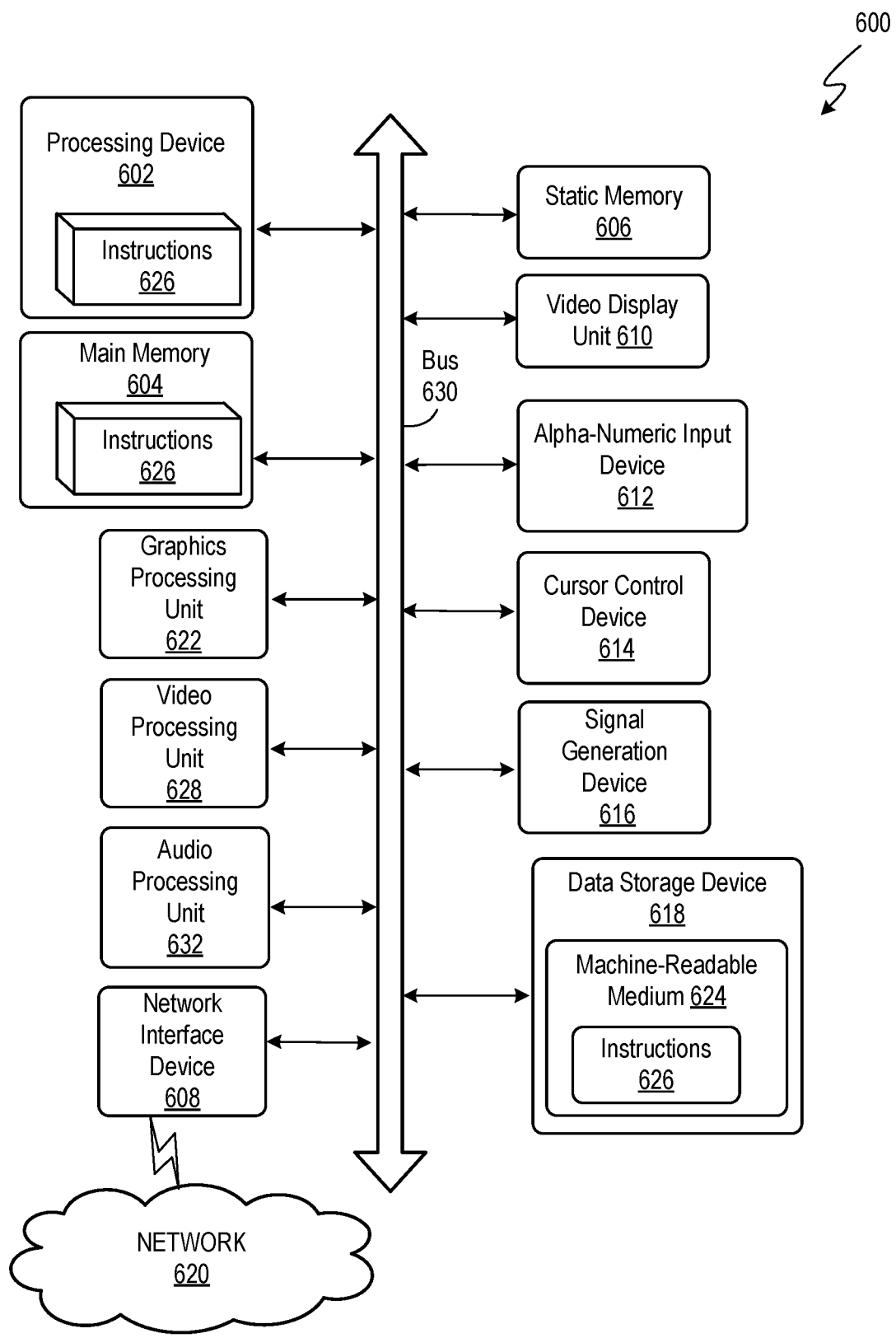
FIG. 6 illustrates an example machine of a computer system within which a set of instructions, for causing the machine to perform any one or more of the methodologies discussed herein, may be executed in accordance with some embodiments disclosed herein.

FIG. 6 illustrates an example machine of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM), a static memory 606 (e.g., flash memory, static random access memory (SRAM), etc.), and a data storage device 618, which communicate with each other via a bus 630.

Processing device 602 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 may be configured to execute instructions 626 for performing the operations and steps described herein.

The computer system 600 may further include a network interface device 608 to communicate over the network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), a graphics processing unit 622, a signal generation device 616 (e.g., a speaker), graphics processing unit 622, video processing unit 628, and audio processing unit 632.

The data storage device 618 may include a machine-readable storage medium 624 (also known as a non-transitory computer-readable medium) on which is stored one or more sets of instructions 626 or software embodying any one or more of the methodologies or functions described herein. The instructions 626 may also reside, completely or at least partially, within the main memory 604 and/or within the processing device 602 during execution thereof by the computer system 600, the main memory 604 and the processing device 602 also constituting machine-readable storage media.

In some implementations, the instructions 626 include instructions to implement functionality corresponding to the present disclosure. While the machine-readable storage medium 624 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 602 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method, comprising:
    determining a set of measurements for a metric of an integrated circuit (IC) design by simulating the IC design over a set of random samples of random variables;
    determining a first set of measurement margins based on the set of measurements, wherein each measurement margin corresponds to a difference between a measurement and a threshold;
    constructing a Gaussian process (GP) model based on the first set of measurement margins, wherein the GP model predicts a second set of measurement margins that would be generated by simulating the IC design; and
    determining, by a processor, a set of failure events for the IC design using the GP model, wherein each failure event corresponds to a set of values of the random variables that is expected to cause the metric of the IC design to violate the threshold.

2. The method of claim 1, wherein the random variables include a process variable, a voltage variable, and a temperature variable.

3. The method of claim 1, wherein the determining the set of failure events for the IC design comprises:
   constructing an acquisition function; and
   using an optimization technique to adaptively determine samples of the random variables by using the acquisition function.

4. The method of claim 3, wherein the acquisition function enables exploration of multiple failure regions of a search space defined by the random variables.

5. The method of claim 1, further comprising determining a probability density function based on the set of failure events.

6. The method of claim 5, further comprising:
   determining a weight function based on the probability density function, wherein the weight function is associated with an importance sampling process; and
   using the importance sampling process to calculate a failure rate of the IC design.

7. The method of claim 6, further comprising using an optimization technique to determine a set of excitation waveforms based on maximizing the failure rate of the IC design.

8. The method of claim 7, wherein each excitation waveform in the set of excitation waveforms is represented as a piece-wise linear function, and the method further comprises testing parametric faults in the IC design using the set of excitation waveforms.

9. A system, comprising:
   a memory storing instructions; and
   a processor, coupled with the memory and to execute the instructions, the instructions when executed cause the processor to:
      determine a set of measurements for a metric of an integrated circuit (IC) design by simulating the IC design over a set of random samples of random variables;
      determine a first set of measurement margins based on the set of measurements, wherein each measurement margin corresponds to a difference between a measurement and a threshold;
      construct a Gaussian process (GP) model based on the first set of measurement margins, wherein the GP model predicts a second set of measurement margins that would be generated by simulating the IC design; and
      determine a set of failure events for the IC design using the GP model, wherein each failure event corresponds to a set of values of the random variables that is expected to cause the metric of the IC design to violate the threshold.

10. The system of claim 9, wherein the random variables include a process variable, a voltage variable, and a temperature variable.

11. The system of claim 9, wherein the determining the set of failure events for the IC design comprises:
    constructing an acquisition function; and
    using an optimization technique to adaptively determine samples of the random variables by using the acquisition function.

12. The system of claim 11, wherein the acquisition function enables exploration of multiple failure regions of a search space defined by the random variables.

13. The system of claim 9, wherein the instructions when executed cause the processor to determine a probability density function based on the set of failure events.

14. The system of claim 13, wherein the instructions when executed cause the processor to:
    determine a weight function based on the probability density function, wherein the weight function is associated with an importance sampling process; and
    use the importance sampling process to calculate a failure rate of the IC design.

15. The system of claim 14, wherein the instructions when executed cause the processor to use an optimization technique to determine a set of excitation waveforms based on maximizing the failure rate of the IC design.

16. The system of claim 15, wherein each excitation waveform in the set of excitation waveforms is represented as a piece-wise linear function, and wherein the instructions when executed cause the processor to test parametric faults in the IC design using the set of excitation waveforms.

17. A non-transitory computer-readable medium comprising stored instructions, which when executed by a processor, cause the processor to:
    determine a set of measurements for a metric of an integrated circuit (IC) design by simulating the IC design over a set of random samples of random variables;
    determine a first set of measurement margins based on the set of measurements, wherein each measurement margin corresponds to a difference between a measurement and a threshold;
    construct a Gaussian process (GP) model based on the first set of measurement margins, wherein the GP model predicts a second set of measurement margins that would be generated by simulating the IC design; and
    determine a set of failure events for the IC design using the GP model, wherein each failure event corresponds to a set of values of the random variables that is expected to cause the metric of the IC design to violate the threshold.

18. The non-transitory computer-readable medium of claim 17, wherein the random variables include a process variable, a voltage variable, and a temperature variable.

* * * * *